United States Patent
Takahashi et al.

(10) Patent No.: US 10,069,142 B2
(45) Date of Patent: Sep. 4, 2018

(54) ROTARY TUBULAR FURNACE, METHOD OF PRODUCING NEGATIVE ELECTRODE ACTIVE MATERIAL FOR NON-AQUEOUS ELECTROLYTE SECONDARY BATTERY, NEGATIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: SHIN-ETSU CHEMICAL CO., LTD., Tokyo (JP)

(72) Inventors: Kohta Takahashi, Takasaki (JP); Masahiro Furuya, Takasaki (JP); Hiroki Yoshikawa, Takasaki (JP); Koichiro Watanabe, Annaka (JP); Takakazu Hirose, Annaka (JP); Hiromichi Kamo, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 107 days.

(21) Appl. No.: 14/881,785

(22) Filed: Oct. 13, 2015

(65) Prior Publication Data
US 2016/0141599 A1    May 19, 2016

(30) Foreign Application Priority Data
Nov. 18, 2014 (JP) ................................. 2014-233658

(51) Int. Cl.
*B01J 19/28* (2006.01)
*H01M 4/48* (2010.01)
(Continued)

(52) U.S. Cl.
CPC ............. *H01M 4/483* (2013.01); *B01J 19/28* (2013.01); *H01M 4/366* (2013.01); *H01M 4/386* (2013.01);
(Continued)

(58) Field of Classification Search
CPC ................................ B01J 19/28; H01M 4/483
See application file for complete search history.

(56) References Cited

U.S. PATENT DOCUMENTS

| 5,395,711 A | 3/1995 | Tahara et al. |
|---|---|---|
| 6,383,686 B1 | 5/2002 | Umeno et al. |
| 2003/0012494 A1 | 1/2003 | Bradshaw et al. |

FOREIGN PATENT DOCUMENTS

| JP | H05-174818 A | 7/1993 |
|---|---|---|
| JP | H06-60867 A | 3/1994 |

(Continued)

OTHER PUBLICATIONS

Aug. 1, 2017 Office Action issued in Japanese Patent Application No. 2014-233658.

*Primary Examiner* — Ula C Ruddock
*Assistant Examiner* — Frank A Chernow
(74) *Attorney, Agent, or Firm* — Oliff PLC

(57) ABSTRACT

The invention provides a rotary tubular furnace including a rotatable furnace tube having an inlet end through which silicon compound particles ($SiO_x$ where $0.5 \leq x < 1.6$) are put therein and an outlet end through which the particles coated with carbon are taken out therefrom; and a heating chamber having a heater to heat the furnace tube, wherein the furnace tube is composed of a heat portion inside the heating chamber and a non-heat portion outside the heating chamber, a length B of the heat portion and an overall length A of the furnace tube satisfy $0.4 \leq B/A < 1$, and a distance C between the heat portion and the outlet end and the overall length A satisfy $0.04 \leq C/A \leq 0.35$. This furnace can inhibit
(Continued)

clogging of the furnace tube and mass-produce a negative electrode active material for a non-aqueous electrolyte secondary battery having a high capacity with inhibited variations in the amount of carbon coating and crystallinity.

18 Claims, 4 Drawing Sheets

(51) Int. Cl.

| | | |
|---|---|---|
| *H01M 4/36* | (2006.01) | |
| *H01M 4/62* | (2006.01) | |
| *H01M 4/38* | (2006.01) | |
| *H01M 4/587* | (2010.01) | |
| *H01M 10/052* | (2010.01) | |

(52) U.S. Cl.
CPC ........... *H01M 4/587* (2013.01); *H01M 4/625* (2013.01); *H01M 10/052* (2013.01); *H01M 2220/30* (2013.01)

(56) References Cited

FOREIGN PATENT DOCUMENTS

| | | |
|---|---|---|
| JP | H10-294112 A | 11/1998 |
| JP | H11-102705 A | 4/1999 |
| JP | 2997741 B2 | 1/2000 |
| JP | 2000-215887 A | 8/2000 |
| JP | 2000-243396 A | 9/2000 |
| JP | 2002-042806 A | 2/2002 |
| JP | 4171897 B2 | 10/2008 |
| JP | 2013-008654 A | 1/2013 |

ROTARY TUBULAR FURNACE, METHOD OF PRODUCING NEGATIVE ELECTRODE ACTIVE MATERIAL FOR NON-AQUEOUS ELECTROLYTE SECONDARY BATTERY, NEGATIVE ELECTRODE ACTIVE MATERIAL FOR NON-AQUEOUS ELECTROLYTE SECONDARY BATTERY, AND NON-AQUEOUS ELECTROLYTE SECONDARY BATTERY

BACKGROUND OF THE INVENTION

Field of the Invention

The present invention relates to a rotary tubular furnace, a method of producing a negative electrode active material for a non-aqueous electrolyte secondary battery by using this furnace, a negative electrode active material for a non-aqueous electrolyte secondary battery produced by this method, and a non-aqueous electrolyte secondary battery containing this negative electrode active material.

Description of the Related Art

As mobile devices such as mobile electronic devices and mobile communication devices have highly developed, secondary batteries with higher energy density are needed to improve efficiency and reduce the size and weight of the devices. The capacity of the secondary batteries of this type can be improved by known methods: use of a negative electrode material made of an oxide of V, Si, B, Zr or Sn, or a complex oxide thereof (See Patent Documents 1 and 2, for example); use of a negative electrode material made of a metal oxide subjected to melting and rapid cooling (See Patent Document 3, for example); use of a negative electrode material made of a silicon oxide (See Patent Document 4 for example); use of a negative electrode material made of $Si_2N_2O$ and $Ge_2N_2O$ (See Patent Document 5 for example), and others. The negative electrode materials can be made conductive by known methods: performing pressure welding of SiO and graphite, and carbonizing the resultant (See Patent Document 6, for example); coating silicon particles with carbon layers by chemical vapor deposition (See Patent Document 7, for example); coating silicon oxide particles with carbon layers by chemical vapor deposition (See Patent Document 8, for example).

Although these conventional methods increase the charging and discharging capacity and energy density to some extent, the increase is insufficient for market needs and the cycle performance fails to fulfill the needs. The conventional methods need to further improve the energy density and thus are not entirely satisfactory.

Patent Document 4 discloses use of a silicon oxide as a negative electrode material for a lithium-ion secondary battery so as to obtain an electrode with a high capacity. To the present inventor's knowledge, however, this method cannot achieve low irreversible capacity at first charging and discharging and a practical level of cycle performance, so this method can be improved on.

The methods to provide a negative electrode active material with conductivity remain the following problems. The method in Patent Document 6 uses solid-state welding and thus cannot uniformly form a carbon coating, resulting in insufficient conductivity. Although the method in Patent Document 7 enables the formation of a uniform carbon coating, this method uses Si as a negative electrode active material and thus reduces the cycle performance because the expansion and contraction of the material becomes too large at lithium insertion or extraction. This makes the material unsuited to practical use. The charging capacity consequently needs to be limited to avoid this problem. Although the method in Patent Document 8 enables the improvement in cycle performance, the material produced by this method lacks the precipitation of silicon fine particles and the conformity with the structure of a carbon coating, and thus is unpractical for use in secondary batteries. This material causes the batteries to gradually reduce the capacity with an increase in charging and discharging cycles and to greatly reduce the capacity after given cycles. In Patent Document 9, a silicon oxide expressed by a general formula of $SiO_x$ is coated with a carbon coating by chemical vapor deposition to improve the capacity and the cycle performance.

Use of a negative electrode active material coated with a carbon coating such as a graphite coating to give conductivity to this material allows for acquisition of an electrode with a high capacity and good cycle performance. Patent Document 10, for example, proposes mass-production of this negative electrode active material with a rotary kiln, which is a continuous furnace.

CITATION LIST

Patent Literature

[Patent Document 1] Japanese Patent Application Publication No. H05-174818
[Patent Document 2] Japanese Patent Application Publication No. H06-60867
[Patent Document 3] Japanese Patent Application Publication No. H10-294112
[Patent Document 4] Japanese Patent No. 2997741
[Patent Document 5] Japanese Patent Application Publication No. H11-102705
[Patent Document 6] Japanese Patent Application Publication No. 2000-243396
[Patent Document 7] Japanese Patent Application Publication No. 2000-215887
[Patent Document 8] Japanese Patent Application Publication No. 2002-42806
[Patent Document 9] Japanese Patent No. 4171897
[Patent Document 10] Japanese Patent Application Publication No. 2013-8654

SUMMARY OF THE INVENTION

Thus, there is a proposition that the rotary kiln is used to coat a negative electrode active material with carbon such as graphite. In a process of coating silicon powder with carbon by using the rotary kiln, however, if the silicon powder is coated with carbon in the interior of a furnace tube having a long portion that is not heated on its outlet side, particles are readily attached on the inner wall of the furnace tube, making the furnace tube easy to be clogged by the particles. This clogging changes the bulk of the silicon powder in the furnace tube, thereby causing variation in the amount of contact between the silicon powder and a carbon source or in thermal history of the silicon powder. Accordingly, variations in physical properties of the collected material such as the amount of carbon coating or crystallinity are increased. In particular, these variations in physical properties occur, when such a furnace tube is used to coat a silicon compound of $SiO_x$ with carbon where $0.5 \leq x < 1.6$. Use of silicon powder with variations in its physical properties as a negative electrode active material of a secondary battery degrades battery characteristics degrades the battery characteristics of the battery.

The present invention was accomplished in view of the above problems, and it is an object of the present invention to provide a rotary tubular furnace that can inhibit the clogging of the interior of the furnace tube and thereby mass-produce negative electrode active materials for a non-aqueous electrolyte secondary battery having a high capacity and an excellent cycle performance with inhibited variations in the amount of carbon coating and crystallinity.

In order to accomplish the above object, the preset invention provides a rotary tubular furnace for producing a negative electrode active material for a non-aqueous electrolyte secondary battery by pyrolyzing an organic gas to coat each of silicon compound particles of $SiO_x$ with carbon where $0.5 \leq x < 1.6$, comprising: a rotatable furnace tube having an inlet end through which the particles are put therein and an outlet end through which the particles coated with the carbon are taken out therefrom; and a heating chamber having a heater configured to heat the furnace tube, the tubular furnace being configured to agitate the particles put in an interior of the furnace tube by rotating the furnace tube while the furnace tube is heated by the heater, whereby each of the particles is coated with the carbon, and to take out the particles coated with the carbon through the outlet end, wherein the furnace tube is composed of a heat portion located inside the heating chamber having the heater and a non-heat portion located outside the heating chamber, a length B of the heat portion and an overall length A of the furnace tube satisfy $0.4 \leq B/A < 1$, and a distance C between the heat portion and the outlet end of the furnace tube and the overall length A satisfy $0.04 \leq C/A \leq 0.35$.

This inventive rotary tubular furnace can continuously coat the silicon compound particles with carbon, thereby mass-producing negative electrode active materials having an improved conductivity with a performance level satisfying the market requirement, and reducing production cost. When the value of B/A is less than 0.4, the carbon coating cannot be uniformly formed because the time for pyrolysis reaction becomes short, and the clogging is easy to occur because the length of the heat portion becomes short. If the rotary tubular furnace supports its ends by shafts, the relationship of B/A=1 cannot be satisfied. This rotary tubular furnace, which supports its ends by the shafts, cannot satisfy the relationship of C/A<0.04. When the value of C/A is more than 0.35, the clogging of the furnace tube due to particles attached to its inner wall frequently occurs because the non-heat part on the side of the outlet end of the furnace tube becomes too large. This makes it impossible to stably operate the furnace. In contrast, the invention, which limits the values of B/A and C/A to the above ranges, can inhibit the clogging in the interior of the furnace tube and thereby obtain a negative electrode active material for a non-aqueous electrolyte secondary battery having a high capacity and an excellent cycle performance with inhibited variations in the amount of carbon coating and crystallinity.

In the inventive rotary tubular furnace, the diameter D of the furnace tube and the length B of the heat portion preferably satisfy $0.08 \leq D/B \leq 0.3$.

When the value of D/B is 0.08 or more, the diameter of the furnace tube becomes sufficiently large, so sufficient throughput can be secured, resulting in better productivity. When the value of D/B is 0.3 or less, the bulk of the particles can be controlled to be proper in thickness with respect to the diameter of the furnace tube, so the carbon coating can be more uniformly formed.

The furnace tube is preferably made of any one of heat resist cast steel, nickel-based superalloy, nickel-molybdenum-chrome alloy, carbon material, alumina, SiC, magnesia-carbon material, alumina-magnesia-carbon material, and magnesia-chrome material.

The furnace tube made of any one of these materials has excellent heat resistance.

The carbon material is preferably any one of cold isostatic pressed graphite, extruded graphite, molded graphite, composite material of carbon fiber and resin, and composite material of carbon fiber and a carbon-based matrix.

In the invention, these carbon materials are preferably used.

The inventive rotary tubular furnace preferably includes a mechanism for vibrating the furnace tube.

The inventive rotary tubular furnace including the mechanism for vibrating the furnace tube can effectively inhibit the clogging because the particles are hard to attach to the inner wall of the furnace tube.

The mechanism for vibrating the furnace tube is preferably any one of a knocker, a mechanism using a falling object to impact, an ultrasonic generator, and a vibrator.

The knocker is preferably air-driven or electromagnetically driven.

In the invention, the furnace tube is preferably vibrated with such a mechanism.

The heating chamber is preferably capable of adjusting a temperature of an interior of the heat portion of the furnace tube to a temperature ranging from 800° C. to 1,200° C. when each of the particles is coated with the carbon.

If the heating chamber can adjust the temperature to 800° C. or more, the carbon coating can efficiently be formed, the processing time can be reduced, and the productivity can be improved. If the heating chamber can adjust the temperature to 1,200° C. or less, the silicon compound particles can be prevented from excessively disproportionation and the fusion bonding and agglomeration of each particle can be avoided during the chemical vapor deposition, so the carbon coating can be uniformly formed.

Furthermore, the invention provides a method of producing a negative electrode active material for a non-aqueous electrolyte secondary battery, comprising using a rotary tubular furnace configured as above to coat each of silicon compound particles of $SiO_x$ with carbon where $0.5 \leq x < 1.6$.

This negative electrode active material for a non-aqueous electrolyte secondary battery produced by the inventive producing method is inexpensive and allows for production of a secondary battery having high charging and discharging capacities and excellent cycle performance.

The invention also provides a negative electrode active material for a non-aqueous electrolyte secondary battery, produced by this method.

This negative electrode active material for a non-aqueous electrolyte secondary battery produced allows for production of a secondary battery having high charging and discharging capacities and excellent cycle performance when used for a negative electrode of the secondary battery.

The invention also provides a non-aqueous electrolyte secondary battery comprising a negative electrode containing this negative electrode active material.

This non-aqueous electrolyte secondary battery has high charging and discharging capacities and excellent cycle performance.

A rotary tubular furnace according to the invention, which has the furnace tube satisfying the relationship of $B/A \geq 0.4$, ensures a sufficient time for pyrolysis reaction and prevents clogging by particles because of its heat portion having a sufficiently long length, consequently enabling the formation of a uniform carbon coating. In addition to this, the furnace tube can be inhibited from being clogged due to particles attached to its inner wall because when the value of C/A is 0.35 or less, the length of the non-heat portion on the side of the outlet end becomes short, in which clogging easy to occur. Use of this rotary tubular furnace accordingly enables production of a negative electrode active material having a uniform carbon coating and uniform crystallinity. The furnace also can continuously coat each of the silicon compound particles with carbon, thereby allowing mass-production of negative electrode active materials having an improved conductivity with a performance level satisfying the market requirement, and reducing production cost.

DETAILED DESCRIPTION OF THE PREFERRED EMBODIMENTS

Figure 1:
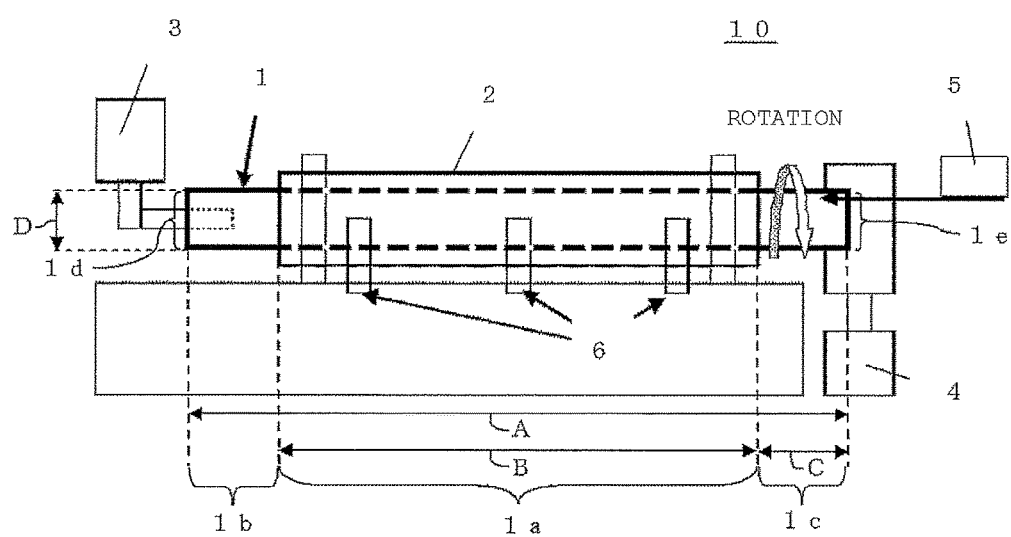
FIG. 1 is a schematic view showing an exemplary rotary tubular furnace according to the present invention.

An embodiment of the present invention will hereinafter be described, but the present invention is not limited to this embodiment.

The present inventors conducted various studies to improve the capacity and cycle performance of a secondary battery and consequently confirmed that battery characteristics can be greatly improved by coating silicon compound particles with carbon by pyrolysis of an organic gas. At the same time, the inventors found that mass-production with conventional equipment such as a batch furnace is impractical. In view of this, the inventors considered the possibility of continuous production and consequently found the following: use of a rotary tubular furnace that rotates its furnace tube allows continuous production with a performance level satisfying the market requirement, and the furnace tube can be inhibited from being clogged by optimizing the structure of the furnace tube of the rotary tubular furnace, particularly adjusting the dimension of parts of the furnace tube to given ranges. The inventors thereby brought the invention to completion.

The invention will be described below in more detail.

A rotary tubular furnace according to the invention produces a negative electrode active material for a non-aqueous electrolyte secondary battery by coating each of silicon compound particles of $SiO_x$ with carbon where $0.5 \leq x < 1.6$.

These silicon compound particles ($SiO_x$ where $0.5 \leq x < 1.6$) to be coated with carbon have an average diameter preferably ranging from 0.01 μm to 50 μm, more preferably from 0.1 μm to 20 μm, particularly preferably from 0.5 μm to 15 μm, but the invention is not limited to these diameter. When the average diameter is 0.01 μm or more, the material is hardly affected by surface oxidation because its surface area is prevented from becoming too large. This allows the material to have a high purity and to maintain high charging and discharging capacities when the material is used as a negative electrode active material for a lithium-ion secondary battery. The bulk density of this material can also be increased, resulting in an increase in charging and discharging capacities per volume. When the average diameter is 50 μm or less, a slurry obtained by adding a negative electrode active material for a non-aqueous electrolyte secondary battery can readily be applied, for example, to a current collector when an electrode is produced. It is to be noted that the average diameter can be expressed by a volume average particle diameter by particle size distribution measurement using laser diffractometry.

Particles having composite structure in which silicon fine particles are dispersed in a silicon-based compound can be used as the silicon compound, but the invention is not limited thereto. All of these particles are also expressed by $SiO_x$ where $0.5 \leq x < 1.6$. This silicon compound is preferably an inactive compound; more specifically silicon dioxide is preferable because such particles are easy to produce. In addition, these particles preferably have the following properties (i) and (ii).

(i) The silicon fine particles (crystals) preferably has a crystallite size ranging from 1 nm to 500 nm, more preferably from 2 nm to 200 nm, further preferably from 2 nm to 20 nm; this crystallite size is calculated by the Scherrer method on the basis of a spread of a diffraction line in which a diffraction peak that is attributable to Si (111) centered near $2\theta = 28.4°$ is observed in X-ray diffraction (Cu—Kα) using copper as a counter negative electrode. When the size of the silicon fine particles is 1 nm or more, the charging and discharging capacities can be kept high. When this size is 500 nm or less, expansion and contraction at charging and discharging are inhibited, and the cycle performance is improved. It is to be noted that the size of the silicon fine particles can also be measured by using photography of transmission electron microscope.

(ii) In measurement of a solid state NMR ($^{29}$Si-DDMAS), spectrums have a broad peak of silicon dioxide centered near $-110$ ppm, and a peak of silicon centered near $-84$ ppm, which is featured as a diamond crystal structure. It is to be noted that these spectrums differ markedly from those of normal silicon oxide ($SiO_x := 1.0 + \alpha$). Their compositions are clearly different. The silicon crystals dispersed in an amorphous silicon dioxide can be observed by a transmission electron microscope. The amount of silicon fine particles (Si) dispersed in a silicon-silicon dioxide dispersion (Si/$SiO_2$) preferably ranges from 2 mass % to 36 mass %, more preferably from 10 mass % to 30 mass %. When this amount is 2 mass % or more, the charging and discharging capacities can be kept high. When this amount is 36 mass % or less, good cycle performance can be obtained. A reference substance of a chemical shift in measurement of the solid NMR is hexamethyl cyclotrisiloxane, which is a solid at the measurement temperature.

It is to be noted that the particle (silicon composite powder) having composite structure in which silicon fine crystals are dispersed in a silicon compound is a particle having a structure in which silicon fine particles are dispersed in a silicon compound. A method of producing this particle is not particularly limited, provided its average diameter ranges from 0.01 μm to 50 μm; the following method can be preferably used.

An example of the preferable method is to perform a heat treatment at temperatures from 900° C. to 1,400° C. under an inert gas atmosphere on silicon oxide particles or powder expressed by a general formula of $SiO_x$ where $0.5 \leq x < 1.6$, so that these particles disproportionate. All of the particles after the disproportionation are also expressed by $SiO_x$ where $0.5 \leq x < 1.6$.

It is to be noted that the term "silicon oxide" in the invention is a general term for an amorphous silicon oxide usually obtained by heating a mixture of silicon dioxide and metallic silicon to produce a silicon monoxide gas and cooling and precipitating the silicon monoxide gas. The silicon oxide powder is expressed by a general formula of $SiO_x$; the lower limit of its average diameter is preferably 0.01 μm or more, more preferably 0.1 μm or more, further preferably 0.5 μm or more; the upper limit of its average diameter is preferably 50 μm or less, more preferably 20 μm or less, further preferably 15 μm or less. The BET specific surface area is preferably 0.1 m²/g or more, more preferably 0.2 m²/g or more. The upper limit of the BET specific surface area is preferably 30 m²/g or less, more preferably 20 m²/g or less. The value of x is in the range of $0.5 \leq x < 1.6$, preferably $0.8 \leq x < 1.3$, more preferably $0.8 \leq x \leq 1.0$.

The silicon oxide powder having the above range of average diameter and BET specific surface area facilitates acquisition of silicon composite powder having a desired average diameter and BET specific surface area. When x is less than 0.5, $SiO_x$ powder has poor cycle performance. When x is more than 1.6, this powder has a large ratio of inactive $SiO_2$ after being subjected to a heat treatment to disproportionate and may reduce charging and discharging capacities when used for a lithium-ion secondary battery.

When the heat treatment is performed at 900° C. or more to cause a silicon oxide to disproportionate, the disproportionation efficiently proceeds, and Si fine cells (silicon fine crystals) can be efficiently formed for a short period of time. When this heat treatment is performed at 1400° C. or less, a lithium-ion secondary battery is prevented from losing its function because silicon dioxide in the silicon oxide is inhibited from being structured and the movement of lithium ions is not impeded. The heat treatment is performed more preferably at temperatures ranging from 1,000° C. to 1,300° C., particularly preferably at temperatures ranging from 1,000° C. to 1,200° C. The time for the heat treatment (disproportionation) can be selected properly from the range from 10 minutes to 20 hours, particularly from 30 minutes to 12 hours, depending on the temperature of the disproportionation. When the temperature is 1,100° C., for example, it takes about 5 hours to obtain silicon composite powder having desired physical properties such as the above physical properties (i) and (ii) by the disproportionation.

This heat treatment for disproportionation can be performed with a reactor having a heater under an insert gas atmosphere. The reactor may be, but not limited to, a furnace that can perform a heat treatment continuously or in a batch manner. More specifically, a fluidized bed reactor, a rotary furnace, a vertical moving bed reactor, a tunnel furnace, a batch furnace, a rotary kiln, and so on may be selected properly depending on the purpose. In this heat treatment, a gas that is inert at the above heat treatment temperature, such as Ar, He, $H_2$, or $N_2$, can be used singly or as a mixed gas. The disproportionation can be performed at the same time as the carbon coating is formed with the inventive rotary tubular furnace. If the disproportionation and carbon coating processes are simultaneously performed, a rotary kiln, for example, can be used as the rotary tubular furnace.

The inventive rotary tubular furnace for coating the above silicon compound particles ($SiO_x$ where $0.5 \leq x < 1.6$) with carbon will now be described with reference to FIG. 1 and FIG. 2.

As shown in FIG. 1, the inventive rotary tubular furnace 10 mainly includes a furnace tube 1 to coat a raw material, silicon compound particles ($SiO_x$ where $0.5 \leq x < 1.6$), with carbon in its interior, a heating chamber 2 including a heater to heat the furnace tube 1, a feeder 3 capable of continuously introducing the raw material into the furnace tube 1, a container 4 to collect the silicon compound particles coated with carbon, and a gas supply mechanism 5 to supply a raw material gas that is a raw material of the carbon coating to the interior of the rotary tubular furnace 10.

The furnace tube 1 is a tube having an inlet end 1d through which the raw material is introduced and an outlet end 1e through which the particles coated with carbon are taken out, and rotatable about its axis.

The rotary tubular furnace 10 configured as above heats the furnace tube 1 by the heater provided in the heating chamber 2 while rotating the furnace tube 1, so that the particles put in the interior of the furnace tube 1 are agitated and each coated with carbon. The particles coated with carbon are taken out through the outlet end 1e. The furnace tube 1 is composed of a portion 1a that can be heated, a heat portion, located inside the heating chamber 2 having the heater and portions 1b and 1c that cannot be heated, non-heating portions, located outside the heating chamber 2.

The inventive rotary tubular furnace 10 satisfies $0.4 \leq B/A < 1$ and $0.04 \leq C/A \leq 0.35$ where A is the overall length of the furnace tube 1, B is the length of the heat portion 1a, and C is the distance between the outlet end 1e and the heat portion 1a of the furnace tube 1, which corresponds to the length of the non-heat portion 1c in FIG. 1. The value of B/A preferably satisfies $0.5 \leq B/A < 1$, more preferably $0.6 \leq B/A < 1$. The value of C/A preferably satisfies $0.07 \leq C/A \leq 0.29$, more preferably $0.1 \leq C/A \leq 0.26$.

The inventive rotary tubular furnace 10, which has the furnace tube 1 satisfying the relationship of $B/A \geq 0.4$, ensures a sufficient time for pyrolysis reaction and prevents the clogging because of its heat portion 1a having a sufficiently long length. The rotary tubular furnace 10 supports both ends of the furnace tube 1 by the respective shafts and therefore cannot satisfy the relationship of B/A=1. This rotary tubular furnace 10, which supports the ends by the respective shafts, cannot satisfy the relationship of C/A<0.04. In addition to this, the furnace tube 1 can be inhibited from being clogged due to particles attached to its inner wall because when the value of C/A is 0.35 or less, the length of the non-heat portion 1c on the side of the outlet end 1e becomes short, in which clogging easy to occur. Such a configuration enables the inhibition of clogging of the furnace tube 1, thereby preventing the bulk of the particles from excessively increasing, so the variations in the amount of carbon coating and the thermal history of the particles can be inhibited. Accordingly, the furnace can produce a negative electrode active material having a uniform carbon coating; this material shows little variation in crystallinity because the disproportionation proceeds as intended. The furnace also can continuously coat each of the silicon compound particles with carbon, thereby allowing mass-production of negative electrode active materials with a performance level satisfying the market requirement, and reducing production cost.

The inventive rotary tubular furnace 10 preferably satisfies $0.08 \leq D/B \leq 0.3$ where D is the diameter of the furnace tube 1 and B is the length of the heat portion 1a. The value of D/B satisfies preferably $0.08 \leq D/B < 0.26$, more preferably $0.08 \leq D/B < 0.22$. When the value of D/B is 0.08 or more, the diameter of the furnace tube becomes sufficiently large, so sufficient throughput can be secured, resulting in better productivity. When the value of D/B is 0.3 or less, the bulk of the particles can be controlled to be proper in thickness with respect to the diameter of the furnace tube 1, so the carbon coating can be more uniformly formed.

The furnace tube 1 is preferably made of any one of heat resist cast steel, nickel-based superalloy, nickel-molybdenum-chrome alloy, carbon material, alumina, SiC, magnesia-carbon material, alumina-magnesia-carbon material, and magnesia-chrome material. These materials provide excellent heat resistance, thereby inhibiting the furnace tube 1 from being deformed or damaged.

Examples of the carbon material that is one of preferred materials of the furnace tube 1 preferably include cold isostatic press (CIP) graphite, extruded graphite, molded graphite, a composite of carbon fiber and resin and a composite of carbon fiber and a matrix of carbon. These carbon materials have high heat resistance and prevent the particles from attaching to the inner wall of the furnace tube 1. The resin combined with the carbon fiber in the composition can be selected from thermosetting resins such as epoxy resin. Carbon matrix or graphite matrix, for example, can be used as the matrix of carbon. This composite of carbon fiber and the matrix of carbon is also called carbon fiber carbon (C/C) composite.

The inventive rotary tubular furnace 10 preferably includes a mechanism 6 for vibrating the furnace tube 1. As shown in FIG. 1, the inventive rotary tubular furnace 10 may include a plurality of mechanisms 6 for vibrating the furnace tube 1, or a single mechanism 6; the number of this mechanism is not particularly limited.

The invention can use any one of a knocker, a mechanism using a falling object to impact, an ultrasonic generator, and a vibrator as the mechanism 6 for vibrating the furnace tube. The knocker can be air-driven or electromagnetically driven. The mechanism 6 for vibrating the furnace tube can be disposed on the outer wall of the furnace tube 1.

Figure 2:
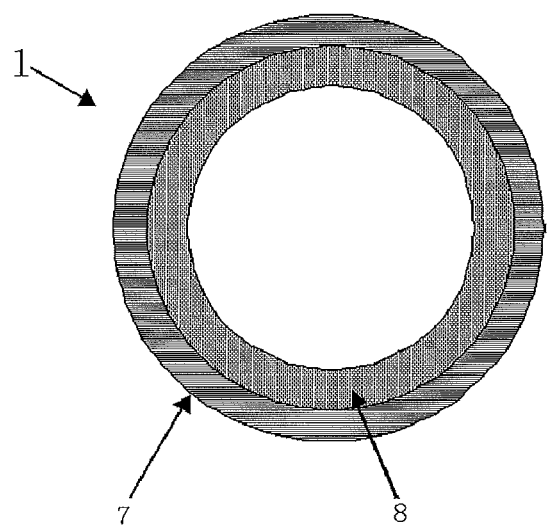
FIG. 2 is a schematic cross-sectional view showing an exemplary furnace tube of the rotary tubular furnace according to the present invention.

As shown in FIG. 2, the furnace tube 1 used in the invention preferably has a dual structure composed of an outer metal part 7 and an inner carbon part 8 that is a portion to come into direct contact with the particles. The reason is that even when the particles agglomerate in the interior of the furnace tube 1 during the carbon coating process, the particles can be inhibited from attaching to the inner wall (the portion to come into contact with the particles) made of carbon. The carbon may be, but not particularly limited to, cold isostatic pressed graphite, extruded graphite, molded graphite, a carbon composite of carbon fiber and resin such as typically epoxy thermosetting resin, or a composite of carbon fiber and carbon matrix or graphite matrix. The attachment of the particles to the inner wall can be effectively inhibited by providing the mechanism 6 for vibrating the furnace tube on the outer wall of the furnace tube 1 and periodically vibrating the furnace tube 1, as described above. The outer metal part or wall is preferable also in this case, for the outer metal part can prevent the furnace tube 1 from breaking even when the mechanism 6 for vibrating the furnace tube impacts the furnace tube 1. This metal is not particularly limited, and may be selected from stainless steel, Inconel (registered trademark), HASTELLOY (registered trademark), and heat resist cast steel, depending on use conditions such as a temperature.

In the invention, the heating chamber 2 is preferably capable of adjusting the temperature of the interior of the heat portion 1a of the furnace tube 1 to temperatures ranging from 800° C. to 1,200. When the processing temperature is 800° C. or more, the carbon coating process is efficiently performed, and the processing time can be reduced, resulting in better productivity. When the processing temperature is 1,200° C. or less, the silicon compound particles can be prevented from excessively disproportioning. In addition, the fusion bonding and agglomeration of each particle can be avoided during the chemical vapor deposition, so a uniform carbon coating with conductivity can be formed. Accordingly, the material provides good cycle performance when used as the negative electrode active material for a lithium-ion secondary battery. If the processing temperature is in the above range, even when the silicon composite powder is coated with carbon, the silicon fine particles are hard to crystallize, so expansion at charging can be inhibited when the material is used as the negative electrode active material for a lithium-ion secondary battery. The term "processing temperature" means the maximum target temperature in the apparatus. This processing temperature usually corresponds to a temperature at the center of the furnace tube 1.

It is to be noted that the processing time is determined properly depending on the target carbon coating amount, processing temperature, the concentration (flow rate) and amount of organic gas, and so on; the processing time at the maximum temperature range normally ranges from 1 hour to 10 hours, particularly from 1 hour to 4 hours for the reason of cost efficiency.

The raw material to generate the organic gas supplied to the interior of the furnace tube 1 in the invention is selected from organic substances capable of generating carbon by pyrolysis at the above heat treatment temperature, particularly under a non-oxidizing atmosphere. Examples of this raw material include hydrocarbon such as methane, ethane, ethylene, acetylene, propane, butane, butene, pentane, isobutane, hexane, and a mixture thereof, and an aromatic hydrocarbon of a monocycle to a tricycle such as benzene, toluene, xylene, styrene, ethylbenzene, diphenylmethane, naphthalene, phenol, cresol, nitrobenzene, chlorobenzene, indene, cumarone, pyridine, anthracene, phenanthrene, and a mixture thereof. A gas light oil obtained by a tar distillation process, a creosote oil, an anthracene oil, a naphtha-cracked tar oil, and a mixture thereof can also be used.

The inventive rotary tubular furnace 10 is preferably a rotary kiln. The rotary kiln is preferably used as the rotary tubular furnace 10 configured as above.

The physical properties of the silicon compound, i.e., the negative electrode active material, coated with carbon with the rotary tubular furnace according to the inventive producing method will now be described. The amount of the carbon coating is not particularly limited; this amount preferably ranges from 0.3 mass % to 40 mass %, more preferably from 0.5 mass % to 30 mass %, particularly preferably from 2 mass % to 20 mass % with respect to the total amount of the carbon coating and the particle of $SiO_x$ where $0.5 \leq x < 1.6$. When the carbon coating amount is 0.3 mass % or more, a sufficient conductivity can be maintained, and the material provides good cycle performance when used for a non-aqueous electrolyte secondary battery. When the carbon coating amount is 40 mass % or less, the ratio of carbon to the negative electrode material can be made proper, and the ratio of silicon material can be sufficiently increased, so the material provides high charging and discharging capacities when used for a non-aqueous electrolyte secondary battery.

[Method of Producing a Negative Electrode]

First, silicon compound particles of $SiO_x$ (where $0.5 \leq x < 1.6$) are produced as follows. A raw material capable of generating a silicon oxide gas is heated under an inert gas atmosphere or a reduced pressure at temperatures ranging from 900° C. to 1,600° C. to produce the silicon oxide gas. In this case, the raw material is a mixture of metallic silicon powder and silicon dioxide powder. The mole ratio of the mixture preferably satisfies the relationship of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an absorption plate. The temperature in the reactor is decreased to 100° C. or less and then a deposit is taken out. The deposit is pulverized with a ball mill or a jet mill to form powder.

The obtained powder is then coated with carbon by thermal chemical vapor deposition (CVD) with the inventive rotary tubular furnace. This thermal CVD is to fill a furnace in which the silicon oxide powder is placed with a hydrocarbon gas and heat the interior of the furnace. The temperature of pyrolysis can be varied within the range from 700° C. to 1,200° C. The hydrocarbon gas is not particularly limited; the above hydrocarbon gas that can generate carbon by pyrolysis is preferably used. This is because the production cost becomes low, and a disproportionation product is obtained with good physical properties.

The above silicon-based active material is then mixed with a carbon-based active material as needed. Particles of this negative electrode active material are mixed with a binder (a negative electrode binder) and other materials such as conductive additive to form a negative electrode mixture. This mixture is added to an organic solvent, water, or other liquid to form slurry.

The slurry of the negative electrode mixture is then applied to a surface of a negative electrode current collector and dried to form a negative electrode active material layer. In this formation, hot press may be performed as necessary.

[Lithium-Ion Secondary Battery]

A lithium-ion secondary Battery will now be described by way of example of the inventive non-aqueous electrolyte secondary battery using the negative electrode.

[Configuration of Laminate Film Secondary Battery]

Figure 3:
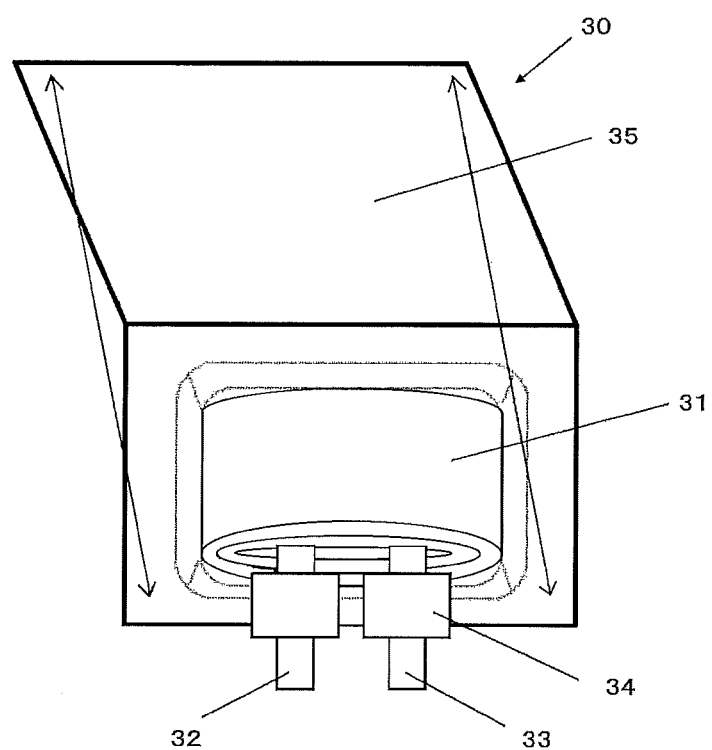
FIG. 3 is a schematic view showing an exemplary configuration of a lithium-ion secondary battery of a laminate film type according to the present invention.

The laminate film secondary battery 30 shown in FIG. 3 includes a wound electrode body 31 interposed between sheet-shaped outer parts 35. The wound electrode body is formed by winding a positive electrode, a negative electrode, and a separator disposed between these electrodes. The electrode body may also be composed of a laminated part of the positive and negative electrodes, and a separator disposed between these electrodes. The electrode bodies of both types have a positive electrode lead 32 attached to the positive electrode and a negative electrode lead 33 attached to the negative electrode. The outermost circumference of the electrode bodies is protected by a protecting tape.

The positive electrode lead and the negative electrode lead, for example, extend from the interior of the outer parts 35 toward the exterior in one direction. The positive electrode lead 32 is made of, for example, a conductive material such as aluminum; the negative electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 31. The fusion-bond layer may be, for example, a film such as a polyethylene or polypropylene film; the metallic layer aluminum foil; the protecting layer nylon.

The space between the outer parts 35 and the positive and negative electrode leads is filled with close adhesion films 34 to prevent air from entering therein. Exemplary materials of the close adhesion films include polyethylene, polypropylene, and polyolefin resin.

[Positive Electrode]

The positive electrode has a positive electrode active material layer disposed on one side or both sides of a positive electrode current collector, for example, as in a negative electrode.

The positive electrode current collector is made of, for example, a conductive material such as aluminum.

The positive electrode active material layer contains a material that can occlude and emit lithium ions or the combination thereof, and may contain a positive electrode binder, a positive electrode conductive additive, a dispersing agent, or other materials according to design. The same detailed description as described for the negative electrode binders and negative electrode conductive additive, for example, is then given for the positive electrode binder and the positive electrode conductive additive.

The positive electrode material is preferably a compound containing lithium. Examples of this compound include a complex oxide composed of lithium and transition metal elements, and a phosphoric acid compound composed of lithium and transition metal elements. Among them, a compound including at least one of nickel, iron, manganese, and cobalt is preferable for the material of the positive electrode. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide composed of lithium and transition metal elements include a lithium cobalt complex oxide ($Li_xCoO_2$), a lithium nickel complex oxide ($Li_xNiO_2$), a lithium nickel cobalt complex oxide. Example of the lithium nickel cobalt complex oxide includes a lithium nickel cobalt aluminum complex oxide (NCA), a lithium nickel cobalt manganese complex oxide (NCM). Examples of the phosphoric acid compound composed of lithium and transition metal elements include a lithium iron phosphoric acid compound ($LiFePO_4$), a lithium iron manganese phosphoric acid compound ($LiFe_{1-u}Mn_uPO_4$ ($0<u<1$)). Use of these positive electrode materials enables a higher battery capacity and excellent cycle performance.

[Negative Electrode]

Figure 4:
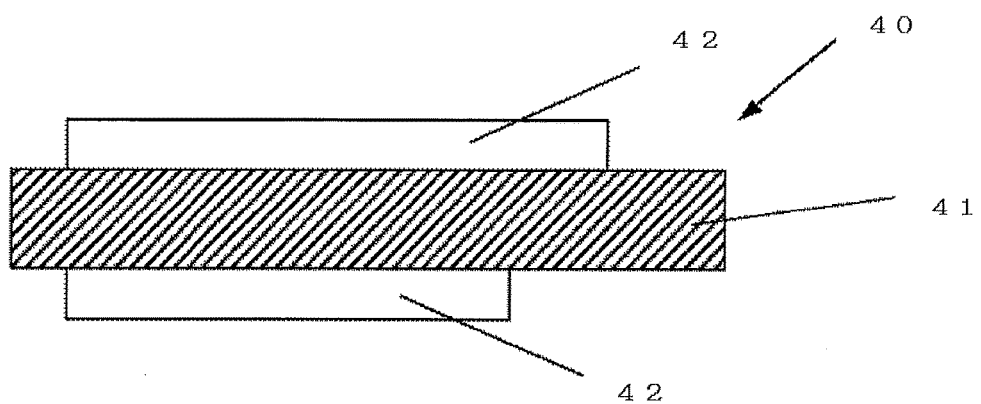
FIG. 4 is a schematic view showing an exemplary negative electrode for a non-aqueous electrolyte secondary battery according to the present invention.

The configuration of the negative electrode will be described with reference to FIG. 4. As shown in FIG. 4, for example, the negative electrode 40 has the negative electrode active material layer 42 on both faces of the current collector 41. The negative electrode preferably has a negative electrode charge capacity larger than an electrical capacitance battery (charge capacity) provided by the positive electrode active material. This negative electrode can inhibit the precipitation of lithium metal on its surface.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

The above area, at which the positive and negative electrode active material layers do not face each other, is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-Dimethoxyethane, and tetrahydrofuran. Among these, ethylene carbonate, propylene carbonate, dimethyl carbonate, diethyl carbonate, or ethylmethyl carbonate, or the combination thereof is particularly preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such a solvent improves, the dissociation of electrolyte salt and ionic mobility.

For an alloyed electrode, the solvent preferably contains a halogenated chain carbonic acid ester, or a halogenated cyclic carbonic acid ester. Such a solvent enables the negative electrode active material to be coated with a stable coating at discharging and particularly charging. The halogenated chain carbonic acid ester is a chain carbonic acid ester including halogen, in which at least one hydrogen atom is replaced by a halogen atom. The halogenated cyclic carbonic acid ester is a cyclic carbonic acid ester including halogen, in which at least one hydrogen atom is replaced by a halogen atom.

The halogen is preferably, but not limited to, fluorine, for fluorine enables the formation of better coating than other halogens do. A larger number of halogens is better, for a more stable coating can be obtained which reduces a decomposition reaction of an electrolyte.

Examples of the halogenated chain carbonic acid ester include carbonic acid fluoromethylmethyl ester, and carbonic acid methyl(difluoromethyl) ester. Examples of the halogenated cyclic carbonic acid ester include 4-fluoro-1,3-dioxolan-2-one or 4,5-difluoro-1,3-dioxolane-2-one.

The solvent preferably contains an unsaturated carbon bond cyclic carbonate as an additives, for this enables the formation of a stable coating on an electrode at charging and discharging and the inhibition of a decomposition reaction of an electrolyte. Examples of the unsaturated carbon bond cyclic carbonate include vinylene carbonate and vinyl ethylene carbonate.

In addition, the solvent preferably contains sultone (cyclic sulfonic acid ester) as an additives, for this enables improvement in chemical stability of a battery. Examples of the sultone include propane sultone and propene sultone.

In addition, the solvent preferably contains acid anhydride, for this enables improvement in chemical stability of a battery. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt is preferably in the range from 0.5 mol/kg to 2.5 mol/kg. This content enables high ionic conductivity.

[Method of Producing a Laminate Film Secondary Battery]

Firstly, a positive electrode is produced with the above positive electrode material as follows. A positive electrode mixture is created by mixing the positive electrode material with as necessary the positive electrode binder, the positive electrode conductive additive, and other materials, and dispersed in an organic solvent to form slurry of the positive electrode mixture. This slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. The compression may be performed under heating and/or repeated many times.

Secondly, a negative electrode active material layer is formed on a negative electrode current collector to produce a negative electrode through the same procedure as in the above production of the negative electrode for a lithium-ion secondary battery.

When the positive and negative electrodes are produced, the active material layers are formed on both faces of the positive and negative electrode current collector. In both the electrodes, the length of these active material layers formed on the faces may differ from one another (See FIG. 4).

Finally, the following steps are carried out in the order described. An electrolyte is adjusted. With ultrasonic welding, the positive electrode lead is attached to the positive electrode current collector and the negative electrode lead is attached to the negative electrode current collector. The positive and negative electrodes and the separator interposed therebetween are stacked or wound to produce the electrode body and a protecting tape is stuck to the outermost circumference of the body. The electrode body is flattened. The film-shaped outer part is folded in half to interpose the electrode body therebetween. The outer edge of the half parts is stuck to one another by heat sealing such that one of the four sides is opened to enter the electrode body therefrom. The close adhesion films are inserted between the outer part and the positive and negative electrode leads. The above adjusted electrolyte is introduced from the open side in a prescribed amount to perform the impregnation of the electrolyte under a vacuum. The open side is stuck by vacuum heat sealing.

In this manner, the laminate film secondary battery can be produced.

The inventive non-aqueous electrolyte secondary battery, such as the laminate film secondary battery, preferably has a negative electrode utilization factor of 93% to 99% at charging and discharging. The secondary battery having a negative electrode utilization factor of 93% or more prevents reduction in the first charge and discharge efficiencies and greatly improves the battery capacity; one having a negative electrode utilization factor of 99% or less prevents the precipitation of lithium, thereby ensuring safety.

EXAMPLES

The present invention will be more specifically described with reference to examples and comparative examples. However, the present invention is not limited to these examples.

Example 1-1

A laminate film secondary battery was produced by the following procedure.

The procedure began with the production of a positive electrode. Positive electrode active materials of 95 mass parts of lithium cobalt oxide ($LiCoO_2$), 2.5 mass parts of positive electrode conductive additive, and 2.5 mass parts of positive electrode binders of polyvinylidene fluoride (PVDF) were mixed to produce a positive electrode mixture. The positive electrode mixture was dispersed in an organic solvent of N-methyl-2-pyrrolidone (NMP) to form paste slurry. The slurry was applied to both surfaces of a positive electrode current collector with a coating apparatus having a die head and dried with a drying apparatus of hot-air type. The positive electrode current collector had a thickness of 15 μm. The resultant was finally compressed with a roll press.

A negative electrode was then produced in the following manner. A mixed raw material of metallic silicon and silicon dioxide was placed in a reactor and vaporized under a vacuum of 10 Pa to accumulate the gas on an absorption plate. The accumulation was sufficiently cooled and then taken out to pulverize the accumulation with a ball mill. In this way, particles of silicon compound ($SiO_x$ where $0.5 \leq x < 1.6$) were produced. After the diameter of these particles was adjusted, thermal CVD was performed with the inventive rotary tubular furnace shown in FIG. 1 to coat each of the particles with carbon, so that the negative electrode active material was produced. When this thermal CVD was performed with the inventive rotary tubular furnace, $SiO_x$ particles were caused to disproportionate. The rotary tubular furnace used was a rotary kiln in which the ratio B/A of the length B of the heat portion and the overall length A of the furnace tube was 0.64; the ratio C/A of the distance C between the heat portion and the outlet end of the furnace tube to the overall length A was 0.18; the ratio D/B of the diameter D of the furnace tube to the length B of the heat portion was 0.11. The processing temperature was 1,000° C. The type of the raw material gas was methane mixed with nitrogen at 50 volume %. The supply rate of the raw material gas was 150 NL/min. The particles were left for 3 hours at the maximum temperature range. The CVD was performed under these conditions. At this time, the silicon compound particles ($SiO_x$ where $0.5 \leq x < 1.6$) were put in the furnace tube at a filling ratio of 10%. The filling ratio in the invention is defined as the ratio of the volume of the particles in the furnace tube to the volume of the furnace tube.

The ratio of the mass of the carbon coating to the total mass of the $SiO_x$ (where $0.5 \leq x < 1.6$) particles and the carbon coating in the produced negative electrode active material was calculated. This ratio is referred to as a carbon coating amount below. The carbon coating amount was measured with a total organic carbon analyzer (made by SHIMADZU CORPORATION). Then, particles were sampled from the produced negative electrode active material powder at 10 points to calculate the carbon coating amount and its standard deviation so that variation in the carbon coating amount was evaluated. The thermal history was compared by the crystallinity measured by X-ray crystallography on the particles. This measurement was made by an apparatus for X-ray crystallography (made by Bruker Corporation). The crystallite size was calculated from a half width of a diffraction peak attributable to Si (111) crystal face by X-ray diffraction.

The produced negative electrode active material, a carbon conductive additive, and polyacrylic acid were then mixed at a dry mass ratio of 85:5:10. The mixture was diluted with pure water to form slurry of a negative electrode mixture.

An electrolytic copper foil, having a thickness of 15 μm, was used as a negative electrode current collector. The negative electrode mixture slurry was finally applied to the negative electrode current collector and dried under a vacuum at 100° C. for 1 hour. The amount of the dried negative electrode active material layer of the negative electrode was 3 mg/cm² per unit area on one side. This amount is also referred to as an area density.

A solvent of 4-fluoro-1,3-dioxolan-2-one (FEC), ethylene carbonate (EC), diethyl carbonate (DMC) were mixed and an electrolyte salt of lithium hexafluorophosphate ($LiPF_6$) was dissolved therein to produce an electrolyte. In this case, the composite of the solvent was FEC:EC:DMC=10:20:70 by volume ratio. The content of the electrolyte salt in the solvent was 1.2 mol/kg.

The secondary battery was assembled by the following procedure. An aluminum lead was first ultrasonic-welded to one end of the positive electrode current collector. A nickel lead was welded to one end of the negative electrode current collector. The positive electrode, a separator, the negative electrode, a separator were then stacked in this order and wound in a longitudinal direction to obtain a wound electrode body. The end of the wounded part was fixed by a PET protecting tape. The separators were a 12-μm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The adjusted electrolyte was poured from an open side to perform the impregnation of the electrolyte under a vacuum. The open side was stuck by heat sealing.

The cycle performance and the first efficiency of the secondary battery thus produced were evaluated.

The cycle performance was investigated in the following manner: first, two cycles of charging and discharging were performed at 25° C. to stabilize the battery and the discharge capacity in the second cycle was measured. Next, the cycle of charging and discharging was repeated until the total number of cycles reached 50 cycles and the discharge capacity was measured every cycle. Finally, a capacity maintenance rate was calculated by dividing the discharge capacity in the 50-th cycle by the discharge capacity in the second cycle. The cycle conditions were as follows: the secondary battery was charged with a constant current of 2.5 mA/cm² until the voltage reached 4.2V. After this voltage reached 4.2V, the charging was continued at 4.2V until the current density reached 0.25 mA/cm². The battery was then discharged with a constant current density of 2.5 mA/cm² until the voltage reached 2.5V.

The first efficiency was calculated by the following expression:

First efficiency (%)=(First discharging capacity/First charging capacity)×100.

The atmosphere and the temperate were the same as the cycle performance was investigated. The charging and discharging conditions were 0.2 times the conditions of the investigation of the cycle performance. More specifically, the battery was charged with a constant current of 0.5 mA/cm² until the voltage reached 4.2V. After this voltage reached 4.2V, the charging was continued at 4.2V until the current density reached 0.05 mA/cm². The battery was discharged with a constant current density of 0.5 mA/cm² until the voltage reached 2.5V.

Examples 1-2 to 1-7 and Comparative Examples 1-1 and 1-2

A negative electrode active material was produced under the same conditions as example 1-1 except that the length B of the heat portion of the rotary tubular furnace was changed to change the value of B/A. The carbon coating amount and the crystallinity of the negative electrode active material, and the cycle performance and the first efficiency of the secondary battery were evaluated in the same manner as example 1-1. In these examples, the value of C/A was not changed.

Table 1 shows the summary of the results in the examples 1-1 to 1-7 and comparative examples 1-1 and 1-2.

uniform. The thermal history of the collected silicon compound showed its variation. In the examples, the disproportionation proceeded as intended. Thus, a longer heat portion enabled the elimination of clogging, the formation of a desired carbon coating, and a proper thermal history, resulting in improvements in the first efficiency and capacity maintenance rate.

In comparative examples 1-1 and 1-2, since the value of B/A was less than 0.4 and the heat portion was too short, the carbon coating was not uniformly formed, resulting in degradation in battery characteristics. When the clogging occurred in comparative examples 1-1 and 1-2, the half width was increased and the crystallite size was decreased. The reason is that the particles in the furnace tube were affected by the clogging and thereby increased its bulk, so arranged heat by the furnace did not sufficiently transferred to the silicon compound. Due to a structural restriction, a rotary kiln cannot heat the whole furnace tube, that is, cannot satisfy the relationship of B/A=1.

Examples 2-1 to 2-8

A negative electrode active material was produced under the same conditions as example 1-1 except that the ratio C/A of the distance C (the length of the non-heated part on the

TABLE 1

Furnace: rotary kiln, C/A = 0.18, filling rate 10%, D/B = 0.11

| Table 1 | overall length A (mm) | heat portion length B (mm) | B/A | clogging | carbon coating amount (mass %) | standard deviation | half width (°) | crystallite (nm) | capacity maintenance rate (%) | first efficiency (%) |
|---|---|---|---|---|---|---|---|---|---|---|
| comparative example 1-1 | 7000 | 1000 | 0.14 | very frequent | 2.8 | 1.02 | 2.07 | 4.0 | 71 | 52 |
| comparative example 1-2 | 7000 | 2000 | 0.29 | frequent | 3.7 | 1.77 | 2.01 | 4.1 | 71 | 59 |
| example 1-1 | 7000 | 4500 | 0.64 | somewhat little | 5.1 | 0.34 | 1.84 | 4.5 | 84 | 69 |
| example 1-2 | 7000 | 2800 | 0.4 | little | 4.8 | 0.41 | 1.93 | 4.3 | 84 | 68 |
| example 1-3 | 7000 | 3500 | 0.5 | little | 4.8 | 0.38 | 1.86 | 4.5 | 85 | 67 |
| example 1-4 | 7000 | 4300 | 0.61 | somewhat little | 5.0 | 0.36 | 1.85 | 4.5 | 84 | 68.5 |
| example 1-5 | 7000 | 5000 | 0.71 | somewhat little | 5.2 | 0.25 | 1.84 | 4.5 | 84 | 68 |
| example 1-6 | 7000 | 6000 | 0.86 | substantially none | 5.4 | 0.12 | 1.82 | 4.6 | 84 | 69 |
| example 1-7 | 7000 | 6500 | 0.93 | substantially none | 5.4 | 0.11 | 1.80 | 4.6 | 83.8 | 69.2 |

As shown in Table 1, the clogging by the particles was inhibited by increasing the ratio of the length B of the heat portion to the overall length A so as to satisfy 0.4≤B/A. Since particles move slowly in the non-heat part, the clogging by these particles is easy to occur. Accordingly, the ratio of the length of the heat portion to the overall length was increased. This allowed the inhibition of the clogging. In this case, the longer the length of the heat portion was, the smaller the standard deviation of the carbon coating amount was. The reason is that the inhibition of the occurrence of the clogging decreased the amount of the particles remained in the furnace tube, thereby making the bulk of the particles side of the outlet end of the furnace tube) between the heat portion and the outlet end of the furnace tube to the overall length A was changed as shown in Table 2. The carbon coating amount and the crystallinity of the negative electrode active material, and the cycle performance and the first efficiency of the secondary battery were evaluated in the same manner as example 1-1. The result is shown in Table 2. It is to be noted that the value of C/A was changed by changing the distance C between the heat portion and the outlet end of the furnace tube.

TABLE 2

Furnace: rotary kiln, B/A = 0.64, filling rate 10%, D/B = 0.11

| Table 2 | overall length A (mm) | non-heat portion length C (mm) | C/A | clogging | carbon coating amount (mass %) | standard deviation | half width (°) | crystallite size (nm) | capacity maintenance rate (%) | first efficiency (%) |
|---|---|---|---|---|---|---|---|---|---|---|
| example 1-1 | 7000 | 1250 | 0.18 | somewhat little | 5.1 | 0.34 | 1.84 | 4.5 | 84.0 | 69.0 |
| example 2-1 | 7000 | 250 | 0.04 | substantially none | 5.1 | 0.10 | 1.80 | 4.6 | 84.1 | 69.2 |
| example 2-2 | 7000 | 500 | 0.07 | substantially none | 6.0 | 0.12 | 1.80 | 4.6 | 84.1 | 69.2 |
| example 2-3 | 7000 | 700 | 0.1 | substantially none | 5.1 | 0.15 | 1.79 | 4.6 | 84.1 | 69.1 |
| example 2-4 | 7000 | 1000 | 0.14 | somewhat little | 5.0 | 0.28 | 1.81 | 4.6 | 84.0 | 69.1 |
| example 2-5 | 7000 | 1500 | 0.21 | little | 4.7 | 0.38 | 1.94 | 4.3 | 84.0 | 68.8 |
| example 2-6 | 7000 | 1800 | 0.26 | little | 4.7 | 0.40 | 1.95 | 4.3 | 84.0 | 68.7 |
| example 2-7 | 7000 | 2000 | 0.29 | little | 4.7 | 0.42 | 1.97 | 4.2 | 84.0 | 68.7 |
| example 2-8 | 7000 | 2250 | 0.32 | somewhat frequent | 4.6 | 0.72 | 2.05 | 4.0 | 83.8 | 68.5 |

The clogging was inhibited by decreasing the length C between the heat portion and the outlet end of the furnace tube so as to satisfy C/A≤0.35. Since particles move slowly in the non-heat part on the side of the outlet end, the clogging by the particles is easy to occur. Accordingly, shortening the length of the non-heat portion on the side of the outlet end can eliminate this problem. Due to a structural restriction, a rotary kiln cannot heat the whole furnace tube, that is, cannot satisfy the relationship of C/A<0.04.

Examples 3-1 and 3-2

A negative electrode active material was produced under the same conditions as example 1-1 except that the filling rate of the silicon compound particles ($SiO_x$ where 0.5≤x<1.6) in the furnace tube was changed as shown in Table 3. The carbon coating amount and the crystallinity of the negative electrode active material, and the cycle performance and the first efficiency of the secondary battery were evaluated in the same manner as example 1-1. The result is shown in Table 3.

When the filling rate was 5% or more, the throughput was increased and the productivity was improved. When the filling rate was 20% or less, the bulk of the particles in the furnace tube was prevented from becoming too large, so the carbon coating process was efficiently performed and the battery characteristics were improved.

Examples 4-1 to 4-7

A negative electrode active material was produced under the same conditions as example 1-1 except that the value of D/B was changed by changing the diameter D of the furnace tube as shown in Table 4. The carbon coating amount and the crystallinity of the negative electrode active material, and the cycle performance and the first efficiency of the secondary battery were evaluated in the same manner as example 1-1. The result is shown in Table 4.

TABLE 3

Furnace: rotary kiln, B/A = 0.64

| Table 3 | filling rate (%) | carbon coating amount mass % | standard deviation | half width (°) | crystallite size (nm) | capacity maintenance rate (%) | first efficiency (%) |
|---|---|---|---|---|---|---|---|
| example 1-1 | 10 | 5.1 | 0.34 | 1.84 | 4.5 | 84 | 69 |
| example 3-1 | 5 | 5.1 | 0.26 | 1.82 | 4.6 | 84 | 69 |
| example 3-2 | 20 | 4.5 | 0.49 | 1.95 | 4.3 | 81 | 67 |

TABLE 4

Furnace: rotary kiln, B/A = 0.64, C/A = 0.18 filling rate 10%

| Table 4 | furnace heat portion B (mm) | furnace tube diameter D (mm) | D/B | carbon coating amount (mass %) | standard deviation | half width (°) | crystallite size (nm) | capacity maintenance rate (%) | first efficiency (%) |
|---|---|---|---|---|---|---|---|---|---|
| example 1-1 | 4500 | 500 | 0.11 | 5.1 | 0.34 | 1.84 | 4.5 | 84.0 | 69.0 |
| example 4-1 | 4500 | 200 | 0.04 | 5.2 | 0.21 | 1.81 | 4.6 | 81.8 | 72.0 |
| example 4-2 | 4500 | 350 | 0.08 | 4.9 | 0.25 | 1.82 | 4.6 | 82.3 | 71.0 |
| example 4-3 | 4500 | 700 | 0.16 | 5 | 0.31 | 1.86 | 4.5 | 83.6 | 68.5 |
| example 4-4 | 4500 | 1000 | 0.22 | 4.9 | 0.36 | 1.89 | 4.4 | 84.3 | 68.3 |
| example 4-5 | 4500 | 1150 | 0.26 | 4.9 | 0.39 | 1.91 | 4.3 | 84.4 | 68.1 |
| example 4-6 | 4500 | 1300 | 0.29 | 4.8 | 0.4 | 1.95 | 4.3 | 84.5 | 68.1 |
| example 4-7 | 4500 | 1500 | 0.33 | 4.5 | 0.46 | 1.96 | 4.2 | 81.6 | 67.8 |

As the ratio of the diameter D of the furnace tube to the length B of the heat portion was larger, the throughput was increased and the productivity was improved. From the viewpoint of the productivity, the relationship of 0.08≤D/B was preferably satisfied. Examples 4-2 to 4-6, which satisfied 0.08≤D/B≤0.3, exhibited a larger carbon coating amount and a larger crystallite size compared with example 4-7. The reason is that when the relationship of D/B≤0.3 was satisfied, the ratio of the diameter D of the furnace tube to the length B of the heat portion was prevented from becoming too large, and the bulk of the particles in the furnace tube was prevented from becoming too large. Example 4-7, which satisfied D/B=0.33, exhibited a lower capacity maintenance rate and a lower first efficiency compared with the examples that satisfied 0.08≤D/B≤0.3. These results however were better than those in comparative examples 1-1 and 1-2.

Examples 5-1 to 5-5

A negative electrode active material was produced under the same conditions as example 1-1 except that the rotary tubular furnace was provided with the mechanism for vibrating the furnace tube as shown in Table 5. The carbon coating amount and the crystallinity of the negative electrode active material, and the cycle performance and the first efficiency of the secondary battery were evaluated in the same manner as example 1-1. The result is shown in Table 5.

TABLE 5

Furnace: rotary kiln, B/A = 0.64, filling rate 10%, C/A = 0.18, D/B = 0.11

| Table 5 | clogging | vibrating mechanism | carbon coating amount (%) | standard deviation | half width (°) | crystallite size (nm) | capacity maintenance rate (%) | first efficiency (%) |
|---|---|---|---|---|---|---|---|---|
| example 1-1 | somewhat little | none | 5.1 | 0.34 | 1.84 | 4.5 | 84.0 | 69.0 |
| example 5-1 | none | air knocker | 5.0 | 0.21 | 1.77 | 4.6 | 84.1 | 69.2 |
| example 5-2 | none | electromagnetic knocker | 5.0 | 0.21 | 1.77 | 4.6 | 841 | 69.1 |
| example 5-3 | none | falling ball | 5.1 | 0.21 | 1.76 | 4.6 | 84.0 | 69.2 |
| example 5-4 | none | ultrasonic wave | 5.0 | 0.22 | 1.77 | 4.6 | 84.0 | 69.1 |
| example 5-5 | none | vibrator | 5.0 | 0.22 | 1.76 | 4.6 | 84.1 | 69.1 |

The clogging was prevented by vibrating the furnace tube. This allowed the formation of a more uniform carbon coating, thereby improving the first efficiency and the capacity maintenance rate.

Examples 6-1 to 6-6

A negative electrode active material was produced under the same conditions as example 5-1 except that the processing temperature in the CVD process was changed as shown in Table 6. The carbon coating amount and the crystallinity of the negative electrode active material, and the cycle performance and the first efficiency of the secondary battery were evaluated in the same manner as example 5-1. The result is shown in Table 6.

TABLE 6

Furnace: rotary kiln B/A = 0.64, filling rate 10%
C/A = 0.18, DB = 0.11, air knocker

| Table 6 | processing temperature (° C.) | carbon coating amount (mass %) | standard deviation | half width (°) | crystallite size (nm) | capacity maintenance rate (%) | first efficiency (%) |
|---|---|---|---|---|---|---|---|
| example 5-1 | 1000° C. | 5.0 | 0.21 | 1.77 | 4.6 | 84.1 | 69.2 |
| example 6-1 | 700° C. | 3.0 | 0.22 | 2.74 | 2.5 | 83.8 | 66.8 |
| example 6-2 | 800° C. | 4.5 | 0.23 | 2.59 | 3.3 | 85.2 | 67.9 |
| example 6-3 | 900° C. | 4.9 | 0.20 | 2.26 | 3.8 | 84.7 | 68.1 |
| example 6-4 | 1050° C. | 5.4 | 0.19 | 1.27 | 6.6 | 84.0 | 69.4 |
| example 6-5 | 1100° C. | 6.1 | 0.19 | 0.80 | 10.8 | 83.8 | 70.1 |
| example 6-6 | 1200° C. | 7.8 | 0.21 | 0.76 | 11.4 | 83.3 | 71.3 |

When the processing temperature was in the range from 800° C. to 1,200° C., the first efficiency and the capacity maintenance rate were improved. When the processing temperature was 800° C. or more, the desired carbon coating was efficiently formed. When the processing temperature was 1,200° C. or less, the silicon compound particles was prevented from excessively disproportionation. Moreover, when the processing temperature was 1,200° C. or less, the fusion bonding and agglomeration of each particle was also avoided during the chemical vapor deposition, so a uniform carbon coating was formed. The first efficiency and the capacity maintenance rate were consequently improved. Although a high capacity maintenance rate was achieved at 700° C., which was lower than 800° C., the first efficiency was somewhat decreased. In this case, however, this result was better than that in comparative examples 1-1 and 1-2.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A rotary tubular furnace for producing a negative electrode active material for a non-aqueous electrolyte secondary battery by pyrolyzing an organic gas to coat each of silicon compound particles of $SiO_x$ with carbon where $0.5 \leq x < 1.6$, comprising:

a rotatable furnace tube having an inlet end through which the particles are put therein and an outlet end through which the particles coated with the carbon are taken out therefrom; and a heating chamber having a heater configured to heat the furnace tube, the tubular furnace being configured to agitate the particles put in an interior of the furnace tube by rotating the furnace tube while the furnace tube is heated by the heater, whereby each of the particles is coated with the carbon, and to take out the particles coated with the carbon through the outlet end, wherein the furnace tube is composed of a heat portion located inside the heating chamber having the heater and a non-heat portion located outside the heating chamber, a length B of the heat portion and an overall length A of the furnace tube satisfy $0.4 \leq B/A < 1$, and a distance C between the heat portion and the outlet end of the furnace tube and the overall length A satisfy $0.04 \leq C/A \leq 0.35$.

2. The rotary tubular furnace according to claim 1, wherein a diameter D of the furnace tube and the length B of the heat portion satisfy $0.08 \leq D/B \leq 0.3$.

3. The rotary tubular furnace according to claim 1, wherein the furnace tube is made of any one of heat resist cast steel, nickel-based superalloy, nickel-molybdenum-chrome alloy, carbon material, alumina, SiC, magnesia-carbon material, alumina-magnesia-carbon material, and magnesia-chrome material.

4. The rotary tubular furnace according to claim 2, wherein the furnace tube is made of any one of heat resist cast steel, nickel-based superalloy, nickel-molybdenum-chrome alloy, carbon material, alumina, SiC, magnesia-carbon material, alumina-magnesia-carbon material, and magnesia-chrome material.

5. The rotary tubular furnace according to claim 3, wherein the carbon material is any one of cold isostatic pressed graphite, extruded graphite, molded graphite, composite material of carbon fiber and resin, and composite material of carbon fiber and a carbon-based matrix.

6. The rotary tubular furnace according to claim 4, wherein the carbon material is any one of cold isostatic pressed graphite, extruded graphite, molded graphite, composite material of carbon fiber and resin, and composite material of carbon fiber and a carbon-based matrix.

7. The rotary tubular furnace according to claim 1, further comprising a mechanism for vibrating the furnace tube.

8. The rotary tubular furnace according to claim 6, further comprising a mechanism for vibrating the furnace tube.

9. The rotary tubular furnace according to claim 7, wherein the mechanism for vibrating the furnace tube is any one of a knocker, a mechanism using a falling object to impact, an ultrasonic generator, and a vibrator.

10. The rotary tubular furnace according to claim 8, wherein the mechanism for vibrating the furnace tube is any one of a knocker, a mechanism using a falling object to impact, an ultrasonic generator, and a vibrator.

11. The rotary tubular furnace according to claim 9, wherein the knocker is air-driven or electromagnetically driven.

12. The rotary tubular furnace according to claim 10, wherein the knocker is air-driven or electromagnetically driven.

13. The rotary tubular furnace according to claim 1, wherein the heating chamber is capable of adjusting a temperature of an interior of the heat portion of the furnace tube to a temperature ranging from 800° C. to 1,200° C. when each of the particles is coated with the carbon.

14. The rotary tubular furnace according to claim 11, wherein the heating chamber is capable of adjusting a temperature of an interior of the heat portion of the furnace tube to a temperature ranging from 800° C. to 1,200° C. when each of the particles is coated with the carbon.

15. The rotary tubular furnace according to claim 12, wherein the heating chamber is capable of adjusting a temperature of an interior of the heat portion of the furnace tube to a temperature ranging from 800° C. to 1,200° C. when each of the particles is coated with the carbon.

16. A method of producing a negative electrode active material for a non-aqueous electrolyte secondary battery, comprising using a rotary tubular furnace according to claim 1 to coat each of silicon compound particles of $SiO_x$ with carbon where $0.5 \leq x < 1.6$.

17. A negative electrode active material for a non-aqueous electrolyte secondary battery, produced by the method according to claim 16.

18. A non-aqueous electrolyte secondary battery comprising a negative electrode containing the negative electrode active material according to claim 17.

* * * * *